United States Patent
Abe et al.

(10) Patent No.: US 11,691,920 B2
(45) Date of Patent: Jul. 4, 2023

(54) HIGH ALUMINA FUSED CAST REFRACTORY AND METHOD OF PRODUCING SAME

(71) Applicant: Saint-Gobain TM K.K., Tokyo (JP)

(72) Inventors: Koya Abe, Tokyo (JP); Hiroshi Sugiyama, Tokyo (JP); Shinji Tsuchiya, Tokyo (JP); Itaru Hashimoto, Tokyo (JP); Yasuo Misu, Tokyo (JP)

(73) Assignee: Saint-Gobain TM K.K., Tokyo (JP)

( * ) Notice: Subject to any disclaimer, the term of this patent is extended or adjusted under 35 U.S.C. 154(b) by 324 days.

(21) Appl. No.: 16/981,557

(22) PCT Filed: Aug. 13, 2019

(86) PCT No.: PCT/JP2019/031871
§ 371 (c)(1),
(2) Date: Sep. 16, 2020

(87) PCT Pub. No.: WO2020/174719
PCT Pub. Date: Sep. 3, 2020

(65) Prior Publication Data
US 2021/0053878 A1 Feb. 25, 2021

(30) Foreign Application Priority Data
Feb. 28, 2019 (JP) .............................. JP2019-036722

(51) Int. Cl.
*C04B 35/107* (2006.01)
*C04B 35/64* (2006.01)

(52) U.S. Cl.
CPC ............ *C04B 35/107* (2013.01); *C04B 35/64* (2013.01); *C04B 2235/3201* (2013.01);
(Continued)

(58) Field of Classification Search
CPC ............... C04B 35/107; C04B 35/64; C04B 2235/3201; C04B 2235/3206;
(Continued)

(56) References Cited

U.S. PATENT DOCUMENTS

| | | | | | |
|---|---|---|---|---|---|
| 3,879,210 | A | * | 4/1975 | LaBar | C04B 35/107 501/128 |
| 5,283,215 | A | * | 2/1994 | Hosokawa | C04B 35/443 501/109 |
| 2006/0172879 | A1 | * | 8/2006 | Boussant-Roux | C03B 5/2375 501/127 |

FOREIGN PATENT DOCUMENTS

| JP | S4418740 B1 | 8/1969 |
|---|---|---|
| JP | S4423819 B1 | 10/1969 |

(Continued)

OTHER PUBLICATIONS

"Refractories and its application"; The Technical Association of Refractories, Japan, May 15, 1979, p. 256 (2 pages).

(Continued)

*Primary Examiner* — Noah S Wiese
(74) *Attorney, Agent, or Firm* — Osha Bergman Watanabe & Burton LLP

(57) ABSTRACT

The present invention provides a high alumina fused cast refractory that is easily produced and has low porosity and high corrosion resistance, and a method of producing the same. The high alumina fused cast refractory of the present invention has the following chemical composition: 95.0 mass % to 99.5 mass % $Al_2O_3$, 0.20 mass % to 1.50 mass % $SiO_2$, 0.05 mass % to 1.50 mass % $B_2O_3$, 0.05 mass % to 1.20 mass % MgO and balance. The method of producing the high alumina fused cast refractory of the present invention includes obtaining a mixture by mixing an $Al_2O_3$ source (Continued)

material, a $SiO_2$ source material, a $B_2O_3$ source material and an MgO source material, and fusing the mixture.

8 Claims, 2 Drawing Sheets

(52) U.S. Cl.
CPC ............... *C04B 2235/3206* (2013.01); *C04B 2235/3208* (2013.01); *C04B 2235/3215* (2013.01); *C04B 2235/3217* (2013.01); *C04B 2235/3409* (2013.01); *C04B 2235/3418* (2013.01); *C04B 2235/9607* (2013.01); *C04B 2235/9684* (2013.01)

(58) Field of Classification Search
CPC ...... C04B 2235/3208; C04B 2235/321; C04B 2235/3409; C04B 2235/3418; C04B 2235/9607; C04B 2235/9684
See application file for complete search history.

(56) References Cited

FOREIGN PATENT DOCUMENTS

| | | |
|---|---|---|
| JP | S4735008 A | 11/1972 |
| JP | S4957012 A | 6/1974 |
| JP | S5988360 A | 5/1984 |
| JP | H6144922 A | 5/1994 |
| JP | 2006523599 A | 10/2006 |
| RU | 2039025 C1 | 7/1995 |

OTHER PUBLICATIONS

International Search Report issued in International Application No. PCT/JP2019/031871 dated Oct. 15, 2019 (2 pages).
Written Opinion issued in International Application No. PCT/JP2019/031871, dated Oct. 15, 2019 (5 pages).

* cited by examiner (a)

(b)

HIGH ALUMINA FUSED CAST REFRACTORY AND METHOD OF PRODUCING SAME

FIELD

The present invention relates to a high alumina fused cast refractory and a method of producing the same. More particularly, the present invention relates to a high alumina fused cast refractory that is easily produced, has low porosity and has high corrosion resistance, and a method of producing the same.

BACKGROUND

High alumina fused cast refractories containing 90 mass % or more of alumina are known in the prior art, and various types of corundum ($\alpha$-$Al_2O_3$), corundum/$\beta$-alumina ($\beta$-$Al_2O_3$) and $\beta$-alumina refractories are widely used in glass furnaces. These high alumina fused cast refractories are required to demonstrate various properties such as corrosion resistance or spalling resistance according to their applications to the upper structure of the glass furnace or contact surface with the molten glass. For example, in the case of using a refractory for the contact surface with molten glass, the refractory is required to have a dense structure with low porosity for the purpose of demonstrating high corrosion resistance.

Among these refractories, since corundum high alumina fused cast refractories in particular normally contain 98 mass % to 99 mass % of alumina and have a dense structure in which $\alpha$-alumina crystals are strongly bonded, they are chemically stable even at extremely high temperatures.

Patent Document 1 discloses such a corundum high alumina fused cast refractory, wherein the high alumina fused cast refractory contains an extremely small amount of MgO in order to improve spalling resistance.

Patent Document 2 discloses a corundum high alumina fused cast refractory that contains $SiO_2$ and $B_2O_3$. Since aluminum borosilicate glass forms an $\alpha$-alumina intercrystalline-bonded film as a result of containing $SiO_2$ and $B_2O_3$, the refractory is free of cracks, and has high corrosion resistance and spalling resistance.

Patent Document 3 discloses a high alumina fused cast refractory having high electrical resistance that is used in glass electric melting furnaces. This refractory contains BaO and CaO in order to increase electrical resistance, and contains $B_2O_3$ to prevent the formation of cracks.

Patent Document 4 discloses a high alumina fused cast refractory used in the regeneration chambers of glass furnaces, wherein the refractory contains MgO in order to improve thermal shock resistance. Patent Document 4 states that the reason for the high thermal shock resistance of this refractory is that the refractory is porous.

Patent Document 5 describes a high alumina fused cast refractory that holds the alkaline metal oxide content thereof to 0.25 mass % or less and is free of $\beta$-alumina. This refractory has uniformly distributed pores and demonstrates superior spalling resistance.

CITATION LIST

Patent Literature

[PATENT DOCUMENT 1] JPS47-35008A
[PATENT DOCUMENT 2] JPS49-57012A
[PATENT DOCUMENT 3] JPH06-144922A
[PATENT DOCUMENT 4] JP2006-523599A
[PATENT DOCUMENT 5] JPS59-88360A

SUMMARY

Technical Problem

An object of the present invention is to provide a high alumina fused cast refractory that is easily produced, has low porosity and has high corrosion resistance, and a method of producing the same.

Solution to Problem

The inventors of the present invention found that the aforementioned problems can be solved with the present invention having the aspects indicated below.

<<Aspect 1>>
A high alumina fused cast refractory, comprising a chemical composition of:
95.0 to 99.5 mass % of $Al_2O_3$;
0.20 to 1.50 mass % of $SiO_2$;
0.05 to 1.50 mass % of $B_2O_3$;
0.05 to 1.20 mass % of MgO; and
balance.

<<Aspect 2>>
The high alumina fused cast refractory described in Aspect 1, wherein the $Na_2O$ content is 0.50 mass % or less.

<<Aspect 3>>
The high alumina fused cast refractory described in Aspect 1 or 2, wherein the sum contents of $Na_2O$ and MgO is 0.30 mass % or more.

<<Aspect 4>>
The high alumina fused cast refractory described in any of Aspects 1 to 3, wherein the $B_2O_3$ content is 0.05 mass % to 0.70 mass % and the MgO content is 0.15 mass % to 0.70 mass %.

<<Aspect 5>>
The high alumina fused cast refractory described in any of Aspects 1 to 4, wherein the BaO content and the CaO content are less than 0.10 mass %, respectively.

<<Aspect 6>>
The high alumina fused cast refractory described in any of Aspects 1 to 5, wherein the corrosion, which is a calculated length of maximum corrosion in the diametrical direction of the cross section of the refractory obtained by immersing the refractory having 19 mm in diameter and 80 mm in length in a molten glass of a LCD glass cullet at 1600° C. for 100 hours, and then cutting the refractory in half along the length direction thereof, is 5.0 mm or less.

<<Aspect 7>>
The high alumina fused cast refractory described in any of Aspects 1 to 6, wherein the apparent porosity measured according to JIS R 2205 is 3.0% or less.

<<Aspect 8>>
The high alumina fused cast refractory described in any of Aspects 1 to 7, wherein the thermal conductivity at 1200° C. measured according to the hot wire method of JIS R 2616 is 7.0 W/m·K or more.

<<Aspect 9>>
The high alumina fused cast refractory described in any of Aspects 1 to 8, wherein the thermal conductivity at 1600° C. measured according to the hot wire method of JIS R 2616 is 9.0 W/m·K or more.

<<Aspect 10>>
A method of producing the high alumina fused cast refractory described in any of Aspects 1 to 9, comprising:

obtaining a mixture by mixing $Al_2O_3$ source material, $SiO_2$ source material, $B_2O_3$ source material, and MgO source material; and fusing the mixture.

DESCRIPTION OF EMBODIMENTS

<<High Alumina Fused Cast Refractory>>

Figure 1:
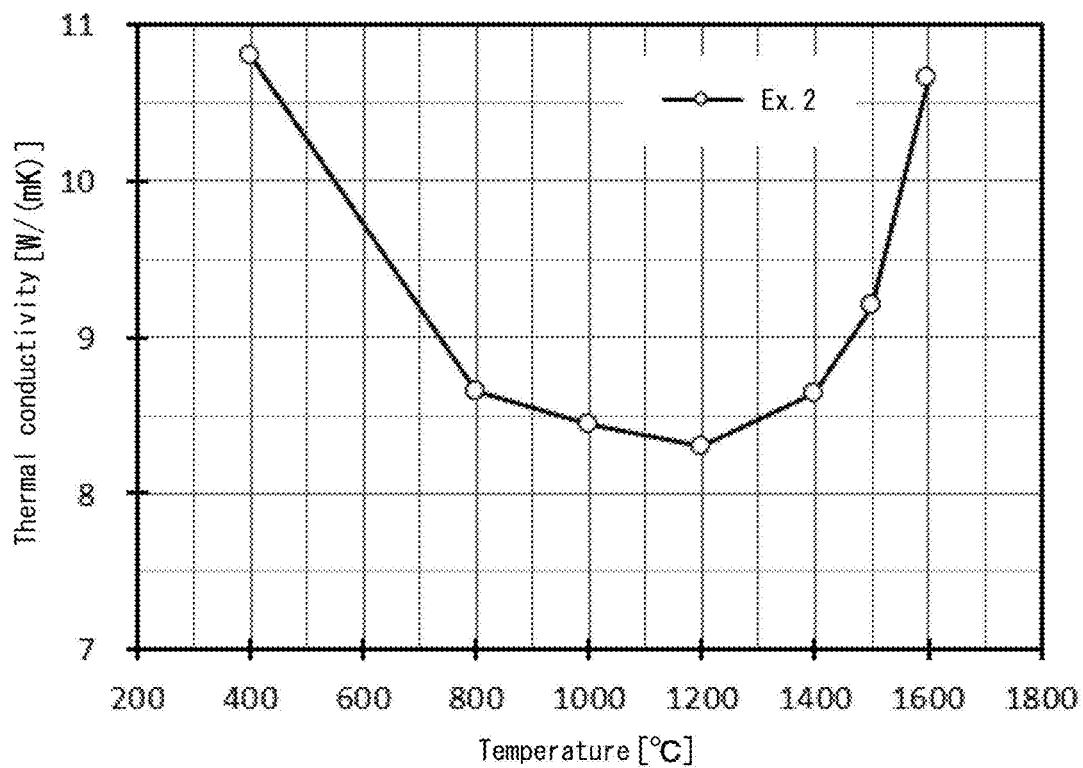
FIG. 1 indicates the temperature dependency of thermal conductivity of the refractory of Example 2.

The refractory of the present invention facilitates handling during production of source materials as well as inhibition of the generation of gas from source materials, thereby facilitating production. In addition, the refractory of the present invention can be made to have low porosity and high corrosion resistance. Moreover, since the refractory of the present invention is able to have low porosity, it is able to demonstrate high thermal conductivity, and since this enables refractories used as glass furnaces to be cooled efficiently from outside the furnace, corrosion resistance of the refractory during use can be further enhanced due to this cooling effect.

The high alumina fused cast refractory of the present invention can have 95.0 mass % to 99.5 mass % of $Al_2O_3$, 0.20 mass % to 1.50 mass % of $SiO_2$, 0.05 mass % to 1.50 mass % of $B_2O_3$, 0.05 mass % to 1.20 mass % of MgO, and other components.

The refractory described in Patent Document 1 does not have adequate corrosion resistance with respect to molten glass and does not have adequate porosity as a result of the α-alumina particles being extremely fine. The porosity of the refractory described in Patent Document 2 is also inadequate.

The refractory described in Patent Document 3 requires the use of nitrates and carbonates of BaO and CaO in order to contain BaO and CaO therein, and as a result of generating nitrate gas and carbon dioxide gas during production, there was the problem of increased susceptibility to the occurrence of variations in product quality due to the formation of bubbles caused by these gases. Furthermore, although it is possible to use BaO and CaO directly, since these compounds react with water, handling during production becomes difficult, and in the case of reacting with water and forming hydroxide, the generation of water vapor during production regularly caused the same problem as in the case of using nitrates and carbonates. The refractory described in Patent Document 4 is a refractory used in a regeneration chamber, does not have adequate corrosion resistance since it was not intended to contact molten glass, and had high porosity as a result of being porous. In addition, the refractory described in Patent Document 5 also does not have adequate corrosion resistance and has high porosity as a result of being porous.

In contrast, the inventors of the present invention found that the aforementioned refractory combining the use of $B_2O_3$ and MgO can be easily produced and can be made to have low porosity and high corrosion resistance.

Although not bound by theory, this is thought to be due to containing $B_2O_3$ and MgO in suitable amounts, thereby lowering melt viscosity and inhibiting the problem of containing an excess of $B_2O_3$, or in other words, inhibiting the problem of the generation of bubbles caused by the vaporization of boron, as well as inhibiting the problem of containing an excess of MgO, or in other words, inhibiting the problem of reduced refractory strength caused by the excessive formation of spinel crystals.

$B_2O_3$ forms a glass phase in the same manner as $SiO_2$. Moreover, although the aforementioned refractory containing MgO demonstrates the formation of spinel crystals depending on the amount of MgO contained, as a result of containing a suitable amount of $B_2O_3$, the MgO is held in the glass phase, thereby inhibiting the formation of spinel crystals. In addition, even if spinel crystals form, due to the presence of $B_2O_3$, the amount of spinel crystals formed is inhibited in comparison with the case of the absence of $B_2O_3$. Consequently, reduction of the glass phase in the refractory can be inhibited and the generation of cracks in the refractory can be prevented. Thus, due to the effect of the combined presence of MgO and $B_2O_3$, in addition to lowering melt viscosity and allowing the obtaining of a dense refractory having low porosity, this effect also prevents the formation of cracks during both production and use of the refractory.

In addition, differing from BaO and CaO, $B_2O_3$ and MgO facilitate handling during production, and since MgO can be present as a stable oxide, there is no generation of gas during refractory production, and the refractory of the present invention is easily produced. Since the refractory of the present invention also has low porosity, it is able to have high thermal conductivity.

Normally, in refractories used in the sidewalls of glass furnaces that come in contact with molten glass, corrosion is frequently inhibited by lowering the temperature of the refractory by cooling from outside the furnace. Thus, in the case the refractory has high thermal conductivity, cooling of refractories used as glass furnaces can be effectively carried out from outside the furnace and the refractory can be cooled easily, thereby making this preferable.

<Chemical Composition>

The following provides a detailed description of each component able to be contained by the refractory of the present invention. The contents of these components were analyzed by crushing the refractory or crushing about 20 g of cooled melt collected during casting thereof. In this case, $B_2O_3$ content was analyzed by ICP spectroscopy, while the contents of other components were analyzed by wavelength-dispersive X-ray spectroscopy (WDS).

($Al_2O_3$)

The chemical composition of the refractory of the present invention is such that the $Al_2O_3$ content is 95.0 mass % to 99.5 mass %. In the case the $Al_2O_3$ content is within this range, high corrosion resistance and high strength at high temperatures can be imparted to the refractory.

The $Al_2O_3$ content may be 95.5 mass % or more, 96.0 mass % or more, 96.5 mass % or more, 97.0 mass % or more, 97.5 mass % or more, 98.0 mass % or more or 98.5 mass % or more, and 99.0 mass % or less, 98.5 mass % or less, 98.0 mass % or less or 97.5 mass % or less. For example, the $Al_2O_3$ content may be 96.5 mass % to 99.0 mass % or 97.0 mass % to 98.5 mass %.

($SiO_2$)

The chemical composition of the refractory of the present invention is such that the $SiO_2$ content is 0.20 mass % to 1.50 mass %. In the case the $SiO_2$ content is within this range, the glass phase in the refractory is adequate and the formation of cracks in the refractory can be prevented. In addition, an amount of $SiO_2$ to this degree results in adequate corrosion resistance of the refractory.

The $SiO_2$ content may be 0.30 mass % or more, 0.40 mass % or more, 0.50 mass % or more or 0.60 mass % or more, and 1.20 mass % or less, 1.00 mass % or less, 0.80 mass % or less or 0.60 mass % or less. For example, the $SiO_2$ content may be 0.30 mass % to 1.20 mass % or 0.40 mass % to 1.00 mass %.

($B_2O_3$)

The chemical composition of the refractory of the present invention is such that the $B_2O_3$ content is 0.05 mass % to 1.50 mass %. In the case the $B_2O_3$ content is within this range, a dense organization is obtained and porosity can be decreased. In addition, the formation of MgO and $Al_2O_3$ compounds in the form of spinel crystals can be inhibited. Moreover, even if spinel crystals are formed, due to the presence of $B_2O_3$, the amount of spinel crystals formed is suppressed and a decrease in the glass phase in the refractory is inhibited in comparison with the absence of $B_2O_3$, thereby making it possible to prevent the formation of cracks during both production and use of the refractory.

The $B_2O_3$ content may be 0.05 mass % or more, 0.25 mass % or more, 0.50 mass % or more or 0.60 mass % or more and 1.20 mass % or less, 1.00 mass % or less, 0.80 mass % or less or 0.60 mass % or less. For example, the $B_2O_3$ content may be 0.05 mass % to 1.20 mass % or 0.05 mass % to 0.70 mass %.

The sum content of $SiO_2$ and $B_2O_3$ that form a glass phase may be 0.25 mass % or more, 0.60 mass % or more, 0.80 mass % or more, or 1.00 mass % or more and 3.00 mass % or less, 1.50 mass % or less, 1.20 mass % or less or 1.00 mass % or less. For example, the sum content of $SiO_2$ and $B_2O_3$ may be 0.30 mass % to 1.20 mass % or 0.40 mass % to 1.00 mass %.

(MgO)

The chemical composition of the refractory of the present invention is such that the MgO content is 0.05 mass % to 1.20 mass %. In the case the MgO content is within this range, fluidity of the melt can be enhanced, a dense organization can be obtained, and porosity can be decreased. Depending on the MgO content, MgO is contained in a glass phase or forms spinel crystals in the fused refractory, or both cases coexist. If $B_2O_3$ is also present, even if the MgO content is as described above, the effect of cracking during production and use of the refractory caused by the formation of spinel crystals is within a range that does not present problems.

The MgO content may be 0.10 mass % or more, 0.20 mass % or more, 0.30 mass % or more or 0.40 mass % or more and 1.00 mass % or less, 0.80 mass % or less or 0.60 mass % or less. For example, the MgO content may be 0.10 mass % to 1.00 mass % or 0.20 mass % to 0.80 mass %.

The mass ratio of the content of $B_2O_3$ to MgO($B_2O_3$/MgO) is preferably 0.1 to 10.0. If this ratio is less than 0.1, it becomes difficult to obtain the effect of inhibiting the formation of spinel crystals, while if this ratio exceeds 10.0, the number of pores increases due to the effect of boron vaporization, thereby making it difficult to obtain a dense refractory. The mass ratio of $B_2O_3$/MgO may be 0.1 to 5.0 or 0.1 to 2.0.

The sum content of MgO and $Na_2O$ that lowers the viscosity of the melt may be 0.30 mass % or more, 0.40 mass % or more, 0.50 mass % or more or 0.80 mass % or more and 1.50 mass % or less, 1.20 mass % or less, 1.00 mass % or less, 0.80 mass % or less or 0.60 mass % or less. For example, the sum content of MgO and $Na_2O$ may be 0.30 mass % to 1.50 mass % or 0.40 mass % to 1.00 mass %.

($Na_2O$)

One of the characteristics of the refractory of the present invention is the use of MgO as a component that lowers the viscosity of the melt, the chemical composition is such that the amount of $Na_2O$ is low, and more specifically, the $Na_2O$ content is preferably 0.50 mass % or less.

According to the prior art, although a small amount of β-alumina is formed and porosity is decreased as a result of containing $Na_2O$, in the present invention, the use of MgO makes it possible to decrease porosity without containing $Na_2O$. Since corrosion resistance can be enhanced and thermal conductivity can be increased in the case of a small amount of β-alumina, a low $Na_2O$ content is extremely advantageous in applications requiring high thermal conductivity.

The $Na_2O$ content may be 0.01 mass % or more, 0.05 mass % or more, 0.10 mass % or more or 0.20 mass % or more and 0.30 mass % or less, 0.20 mass % or less or 0.10 mass % or less. For example, $Na_2O$ content may be 0.01 mass % to 0.50 mass % or 0.05 mass % to 0.30 mass %.

(BaO and CaO)

The refractory of the present invention need not substantially contain both BaO and CaO.

In the case of containing BaO and CaO, the respective content thereof is in excess of 0 mass % and less than 0.10 mass %. The content of each may be 0.02 mass % or more or 0.03 mass % or more and 0.09 mass % or less, 0.05 mass % or less, 0.03 mass % or less or 0.02 mass % or less. For example, the content of BaO and CaO may be 0.01 mass % to 0.05 mass %, respectively.

(Other Components)

The refractory of the present invention may contain other components within a range that does not cause the advantageous effects of the present invention to be lost, and for example, may contain $LiO_2$, $K_2O$, $Fe_2O_3$, MnO, $TiO_2$, $ZrO_2$, PbO, $Cr_2O_3$ or ZnO.

The content of these other components may be 0.01 mass % or more, 0.02 mass % or more or 0.03 mass % or more and 0.10 mass % or less, 0.05 mass % or less, 0.03 mass % or less or 0.02 mass %, respectively. For example, the content of other components may be 0.01 mass % to 0.10 mass % or 0.01 mass % to 0.05 mass %, respectively.

(Mineral Composition)

The mineral composition of the refractory of the present invention is such that the refractory may contain 86.0 mass % or more, 88.0 mass % or more, 90.0 mass % or more or 92.0 mass % or more and 99.7 mass % or less, 94.0 mass % or less, 92.0 mass % or less or 90.0 mass % or less of α-alumina. For example, α-alumina content may be 86.0 mass % to 99.7 mass % or 90.0 mass % to 94.0 mass %.

The mineral composition of the refractory of the present invention is such that the refractory may contain 10.0 mass % or less, 8.0 mass % or less, 5.0 mass % or less, 3.0 mass % or less or 1.0 mass % or less of β-alumina.

The mineral composition of the refractory of the present invention is such that the refractory may contain a maximum of 4.0 mass %, 2.0 mass % or less, 1.0 mass % or less, 0.5 mass % or less or 0.1 mass % or less of spinel crystals.

The mineral composition of the refractory of the present invention is such that the refractory may contain 5.0 mass % or less, 3.0 mass % or less, 2.0 mass % or less, 1.5 mass % or less or 1.0 mass % or less of a glass phase. The refractory may contain 0.25 mass % or more, 0.8 mass % or more, 1.0 mass % or more or 1.5 mass % or more of a glass phase, and for example, the glass phase content may be 0.25 mass % to 3.0 mass % or 0.8 mass % to 1.5 mass %.

(Physical Properties)

(Apparent Porosity)

Apparent porosity of the refractory of the present invention as measured according to the method described in the examples is preferably 3.0% or less. The apparent porosity is particularly preferably 2.5% or less, 2.0% or less, 1.5% or less or 1.0% or less.

(Thermal Conductivity)

As shown in FIG. 1, the thermal conductivity of the refractory of the present invention gradually decreases as temperature rises, reaches a minimum in the vicinity of 1200° C. after which it tends to increase at temperatures above 1200° C. Thus, it is important to evaluate thermal conductivity as a refractory not only at high temperatures of 1500° C. to 1600° C., which is the temperature range of the glass melting temperature of an actual glass furnace, but also thermal conductivity at 1200° C. Evaluating thermal conductivity at both temperatures makes it possible to efficiently control cooling during cooling of the glass furnace.

Thermal conductivity of the refractory of the present invention at 1600° C. as measured according to the method described in the examples is preferably 9.0 W/m·K or more. Thermal conductivity at 1600° C. is particularly preferably 9.5 W/m·K or more, 10.0 W/m·K or more or 10.5 W/m·K or more.

In addition, thermal conductivity of the refractory of the present invention at 1200° C. as measured according to the method described in the examples is preferably 7.0 W/m·K or more. Thermal conductivity at 1200° C. is particularly preferably 7.5 W/m·K or more, 7.8 W/m·K or more, 8.0 W/m·K or more or 8.2 W/m·K or more.

(Corrosion Amount)

Corrosion amount of the refractory of the present invention as measured according to the method described in the examples is preferably 5.0 mm or less. Corrosion amount is particularly preferably 4.5 mm or less, 4.0 mm or less or 3.5 mm or less.

<<Method of Producing High Alumina Fused Cast Refractory>>

The method of producing the refractory of the present invention is a production method for obtaining a refractory as previously described, and includes a step of obtaining a mixture by mixing an $Al_2O_3$ source material, a $SiO_2$ source material, a $B_2O_3$ source material and an MgO source material, and a step of fusing the aforementioned mixture.

There are no particular limitations on the types of $Al_2O_3$ source material, $SiO_2$ source material, $B_2O_3$ source material and MgO source material provided they become each of the components of $Al_2O_3$, $SiO_2$, $B_2O_3$ and MgO in the resulting refractory after fusing and solidification, and source materials commonly known in the art can be used. In the production method of the present invention, production can be carried out easily since it is not necessary to use source materials such as carbonates that generate gas when fusing the source materials.

In the step of fusing the mixture of source materials, commonly known conditions can be employed for the fusing conditions and the like. In the method of the present invention, a cooling step may be carried out after the fusing step.

Although the following provides a more detailed explanation of the present invention using the following examples, the present invention is not limited thereto.

EXAMPLES

Production Example

An $Al_2O_3$ source material obtained according to the Bayer process (purity: 99.7%, median particle diameter: 95 μm, A-210, Sumitomo Chemical Co., Ltd.), $SiO_2$ source material (Freemantle Sand, purity: 99.8%, Hanson Construction Materials Pty. Ltd.), $B_2O_3$ source material (boric anhydride, purity: 98.0%, SHINNIHONDENKO) and MgO source material (Starmag P, purity: 98.0%, Konoshima Co., Ltd.) were blended so as to be present in the resulting refractory at the prescribed ratios described in Table 1. After mixing 70 kg of that mixture, the mixture was fused with an electric arc furnace at an electric energy of 130 kWh (voltage: 160 V).

A cube-shaped graphitic casting mold was prepared in which a pyramidal graphitic riser was connected to the upper portion thereof. Here, the inside dimensions of the upper bottom of the riser were 210 mm×130 mm, the inside dimensions of the lower bottom of the riser were 130 mm×130 mm, the inside dimension of height of the riser was 250 mm, and the riser was connected to the cube-shaped casting mold through an opening in the lower bottom having a diameter of 120 mm. The inside dimensions of the cube-shaped graphitic casting mold were 230 mm×230 mm×230 mm. The aforementioned fused mixture was poured into this casting mold and the casting was extracted from the casting mold after a certain amount of time had elapsed. Subsequently, the casting was buried in alumina powder and allowed to slowly cool to room temperature.

Incidentally, a $Na_2O$ source material (Dense Soda Ash, purity: 99.2%, Tokuyama Corp.) and $Li_2O$ source material (lithium carbonate, Albemarle U.S. Inc.) were used in the comparative examples.

<<Evaluations>>

<Apparent Porosity>

Apparent porosity was measured in compliance with JIS R 2205 by taking a cylindrical sample measuring φ20 mm×50 mm from a surface obtained by grinding 10 mm from the surface of the refractory.

<Thermal Conductivity>

Thermal conductivity was measured at 1200° C. and 1600° C. in compliance with the hot wire method of JIS R 2616 by cutting out a piece measuring 50 mm×100 mm×100 mm from the refractory for use as a sample.

<Corrosion Amount>

Figure 2:
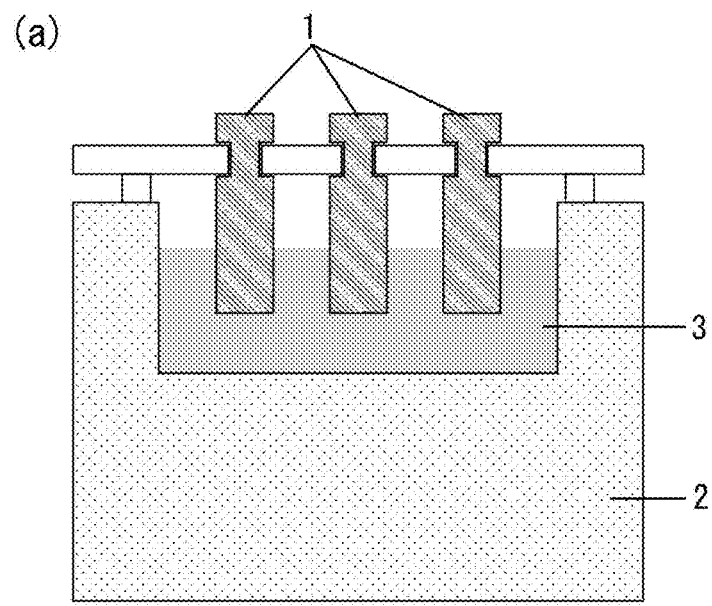
FIG. 2 depicts drawings illustrating a method for measuring the amount of corrosion.
Figure 2:
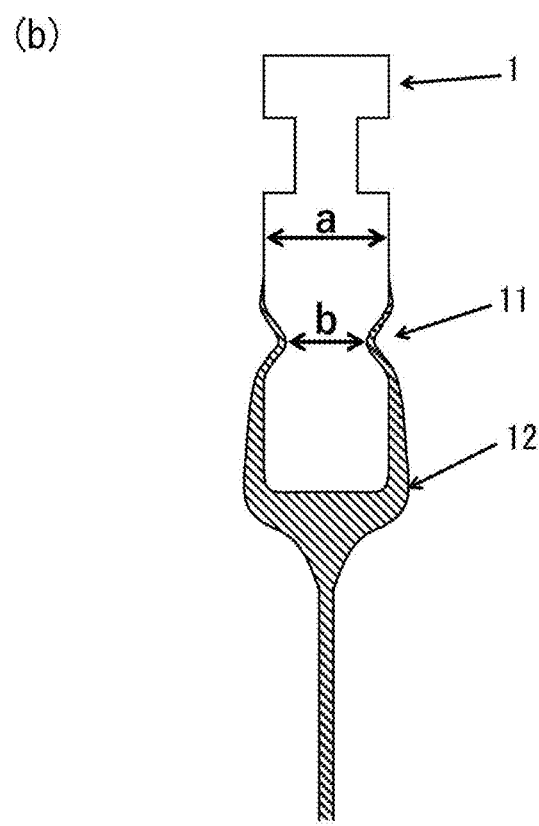

A test of the amount of corrosion was carried out using the apparatus shown in FIG. 2(a). Cylindrical samples (1) of a size measuring about 19 mm in diameter and 80 mm in length were cut out from the refractory. In addition, a crucible (2) made of an HZ (high zirconia) fused cast refractory filled with LCD (liquid crystal display) glass cullet was heated to 1600° C. to fuse the glass cullet, causing the molten glass (3) to fill the inside of the crucible. The aforementioned samples (1) were suspended in the crucible (2), placed so as to be immersed in the molten glass (3) up to a location about ½ to ⅔ from the lower surface of the samples in the lengthwise direction of the samples, and then held for 100 hours in the crucible at 1600° C. As shown in FIG. 2(b), after allowing the samples to cool, the cylindrical samples were cut in half so as to obtain two half cylinders. The diameter (a) of the refractory samples and diameter (b) of the remaining portion at the location of maximum corrosion in cross-sections of the samples obtained by cutting were measured with a caliper followed by calculating the amount of corrosion according to the following formula: $(a-b)/2$.

<<Results>>
The produced samples and evaluation results thereof are shown in Table 1.

|  | Chemical Composition | | | | | | | | | Material Property | | | |
|---|---|---|---|---|---|---|---|---|---|---|---|---|---|
|  | $Al_2O_3$ | $SiO_2$ | $B_2O_3$ | MgO | $Na_2O$ | $LiO_2$ | BaO | CaO | $Fe_2O_3$ + $TiO_2$ | App. Poro. [%] | 1200° C. Therm. Cond. [W/mK] | 1600° C. Therm. Cond. [W/mK] | Corro. Amount [mm] |
| Ex. 1 | 98.7 | 0.52 | 0.05 | 0.25 | 0.21 | <0.01 | 0.01 | 0.02 | 0.02 | 0.8 | 8.5 | 10.8 | 3.5 |
| Ex. 2 | 98.7 | 0.50 | 0.25 | 0.16 | 0.18 | <0.01 | 0.01 | 0.02 | 0.02 | 0.9 | 8.3 | 10.7 | 3.6 |
| Ex. 3 | 97.2 | 0.91 | 0.90 | 0.72 | 0.11 | <0.01 | 0.05 | 0.02 | 0.02 | 2.8 | 7.9 | 10.0 | 4.8 |
| Ex. 4 | 98.4 | 0.31 | 0.15 | 0.46 | 0.41 | <0.01 | 0.03 | 0.02 | 0.02 | 0.8 | 8.4 | 10.7 | 3.4 |
| Ex. 5 | 98.9 | 0.41 | 0.07 | 0.27 | 0.02 | <0.01 | 0.01 | 0.02 | 0.04 | 2.6 | 7.9 | 10.0 | 4.7 |
| Ex. 6 | 97.9 | 0.62 | 0.50 | 0.32 | 0.17 | <0.01 | 0.01 | 0.02 | 0.05 | 1.0 | 8.5 | 10.5 | 3.7 |
| Ex. 7 | 96.8 | 0.85 | 0.75 | 0.91 | 0.31 | 0.01 | 0.01 | 0.05 | 0.02 | 1.9 | 8.1 | 10.2 | 4.0 |
| Ex. 8 | 97.5 | 0.73 | 0.65 | 0.64 | 0.25 | 0.01 | 0.01 | 0.03 | 0.02 | 2.5 | 8.0 | 9.8 | 4.5 |
| C. Ex. 1 | 98.5 | 0.53 | <0.01 | 0.33 | 0.15 | <0.01 | 0.01 | 0.02 | 0.02 | 8.9 | 3.8 | 5.5 | 9.5< |
| C. Ex. 2 | 98.4 | 0.37 | 0.75 | <0.01 | 0.15 | <0.01 | 0.01 | 0.02 | 0.03 | 4.9 | 5.2 | 7.0 | 6.6 |
| C. Ex. 3 | 97.5 | 0.53 | <0.01 | 1.53 | 0.15 | <0.01 | 0.01 | 0.02 | 0.03 | 10 | 2.3 | 4.1 | 9.5< |
| C. Ex. 4 | 98.5 | 0.54 | <0.01 | <0.01 | 0.45 | 0.15 | 0.01 | 0.01 | 0.04 | 4.3 | 4.8 | 6.5 | 6.0 |
| C. Ex. 5 | 97.0 | 1.82 | 0.54 | 0.28 | 0.02 | 0.01 | 0.01 | 0.02 | 0.04 | 4.5 | 6.3 | 7.9 | 6.2 |
| C. Ex. 6 | 97.3 | 0.29 | 0.38 | 1.43 | 0.23 | <0.01 | 0.03 | 0.01 | 0.04 | 6.3 | 6.8 | 8.6 | 8.0 |
| C. Ex. 7 | 96.7 | 0.32 | 2.11 | 0.20 | 0.30 | <0.01 | 0.01 | 0.01 | 0.04 | 9.1 | 5.4 | 7.2 | 9.5< |
| C. Ex. 8 | 99.8 | 0.03 | <0.01 | <0.01 | 0.03 | 0.01 | 0.02 | 0.01 | 0.03 | 23 | 4.9 | 3.1 | 9.5< |

Comparative Examples 1 to 3, which contained either $B_2O_3$ or MgO, did not have adequate porosity, and as a result thereof, thermal conductivity was low. In addition, Comparative Examples 1 to 3 were determined to demonstrate a large amount of corrosion and have inadequate corrosion resistance.

Although Comparative Example 4, which did not contain $B_2O_3$ or MgO but did contain $Na_2O$ and $Li_2O$, had a comparatively small value for porosity, thermal conductivity was low and corrosion resistance was inadequate. This is thought to be due to the presence of a large amount of β-alumina in the refractory of Comparative Example 4. In addition, carbonate was used as a source material in this example resulting in the generation of gas during production.

As a result of having a high $SiO_2$ content, Comparative Example 5 demonstrated both inadequate porosity and corrosion resistance. This is thought to be due to being unable to demonstrate high density as a result of the glass phase being occupied by highly viscous $SiO_2$.

Although Comparative Examples 6 and 7 contained $B_2O_3$ and MgO, both porosity and corrosion resistance were inadequate as a result of the amounts thereof being excessively high.

Comparative Example 8 was substantially composed of alumina and porosity of the refractory was extremely high.

In contrast, the refractories of Examples 1 to 8 did not demonstrate generation of gas during production and had low porosity, high thermal conductivity and high corrosion resistance.

REFERENCE SIGNS LIST

1 Sample
2 Crucible
3 Molten glass
11 Location of maximum corrosion
12 Adhered molten glass

The invention claimed is:
1. A high alumina fused cast refractory, comprising a chemical composition of:
   95.0 to 99.5 mass % of $Al_2O_3$;
   0.20 to 1.50 mass % of $SiO_2$;
   0.05 to 1.50 mass % of $B_2O_3$;
   0.05 to 1.20 mass % of MgO; and
   balance,
   wherein an $Na_2O$ content is 0.50 mass % or less, and
   wherein a sum content of $Na_2O$ and MgO is 0.40 mass % or more.
2. The high alumina fused cast refractory of claim 1, wherein the $B_2O_3$ content is 0.05 to 0.70 mass % and the MgO content is 0.15 to 0.70 mass %.
3. The high alumina fused cast refractory of claim 1, wherein the BaO content and the CaO content are less than 0.10 mass %, respectively.
4. The high alumina fused cast refractory of claim 1, wherein the corrosion, which is a calculated length of maximum corrosion in the diametrical direction of the cross section of the refractory obtained by immersing the refractory having 19 mm in diameter and 80 mm in length in a molten glass of a LCD glass cullet at 1600° C. for 100 hours, and then cutting the refractory in half along the length direction thereof, is 5.0 mm or less.
5. The high alumina fused cast refractory of claim 1, wherein the apparent porosity measured according to JIS R 2205 is 3.0% or less.
6. The high alumina fused cast refractory of claim 1, wherein the thermal conductivity at 1200° C. measured according to the hot wire method of JIS R 2616 is 7.0 W/m·K or more.
7. The high alumina fused cast refractory of claim 1, wherein the thermal conductivity at 1600° C. measured according to the hot wire method of JIS R 2616 is 9.0 W/m·K or more.
8. A method of producing the high alumina fused cast refractory of claim 1, comprising:
   obtaining a mixture by mixing $Al_2O_3$ source material, $SiO_2$ source material, $B_2O_3$ source material, and MgO source material, and fusing the mixture.

* * * * *